(12) United States Patent
Stevens

(10) Patent No.: US 11,503,775 B1
(45) Date of Patent: Nov. 22, 2022

(54) PLANTER SYSTEM AND METHODS FOR GROWING AND DISPLAYING PLANTS

(71) Applicant: Thomas O. Stevens, Springerville, AZ (US)

(72) Inventor: Thomas O. Stevens, Springerville, AZ (US)

( * ) Notice: Subject to any disclaimer, the term of this patent is extended or adjusted under 35 U.S.C. 154(b) by 0 days.

(21) Appl. No.: 17/356,215

(22) Filed: Jun. 23, 2021

(51) Int. Cl.
*A01G 9/029* (2018.01)
*A01G 24/44* (2018.01)

(52) U.S. Cl.
CPC ............ *A01G 9/029* (2018.02); *A01G 24/44* (2018.02)

(58) Field of Classification Search
CPC ...... A01G 9/028; A01G 9/029; A01G 9/0291; A01G 9/0293; A01G 9/0295; A01G 24/44; A01G 24/60
USPC .................................. 47/65, 65.5, 66.1, 66.7
See application file for complete search history.

(56) References Cited

U.S. PATENT DOCUMENTS

| | | | |
|---|---|---|---|
| 3,965,614 A | 6/1976 | Kienholz | |
| 4,107,874 A | 8/1978 | Richardson | |
| 4,148,154 A | 4/1979 | King | |
| 4,242,835 A * | 1/1981 | Mondragon Sorribes | B65D 85/52 47/84 |
| 4,790,105 A * | 12/1988 | Wareing | B65D 85/52 47/84 |
| 5,806,242 A * | 9/1998 | Park | A01G 27/06 47/79 |
| 7,788,849 B1 * | 9/2010 | Cleveland | A01G 9/16 220/4.27 |
| 8,397,429 B2 | 3/2013 | Walli | |
| 2006/0207170 A1 * | 9/2006 | Smith | A01G 24/44 47/56 |
| 2013/0318871 A1 * | 12/2013 | Street | A01G 9/021 47/65.5 |
| 2018/0362213 A1 * | 12/2018 | Van Den Kieboom | B65D 43/0218 |

FOREIGN PATENT DOCUMENTS

| | | | | |
|---|---|---|---|---|
| CN | 108697052 A | * | 10/2018 | ............ A01G 22/15 |
| CN | 112056119 A | * | 12/2020 | ............ A01G 9/086 |
| DE | 3641566 A1 | * | 6/1988 | ............ A01G 9/02 |
| DE | 202015001031 U1 | * | 6/2015 | ............ A01G 9/02 |
| FR | 1308164 A | * | 11/1962 | ............ A01G 9/04 |
| FR | 1561374 A1 | | 8/2005 | |

(Continued)

*Primary Examiner* — Peter M Poon
*Assistant Examiner* — Danielle A Clerkley
(74) *Attorney, Agent, or Firm* — Parsons & Goltry, PLLC; Michael W. Goltry; Robert A. Parsons

(57) ABSTRACT

A planter system includes fluid and light impervious first and second vessels, a plant growing medium, and a fluid impervious third vessel including a perimetric extremity and configured to hold the growing medium received therein through an opening defined by the perimetric extremity. The first and second vessels each includes a closed bottom and a rim encircling an opening over the closed bottom and configured with an inwardly-directed recess. The recess of the first vessel is configured to receive the perimetric extremity of the third vessel for supporting the third vessel over the first closed bottom. The recess of the second vessel is configured to receive the rim of the first vessel in a covering placement of the second vessel over the first vessel, and the closed bottom of the first vessel in a supporting placement of the second vessel under the first vessel.

4 Claims, 15 Drawing Sheets

(56) References Cited

FOREIGN PATENT DOCUMENTS

| GB | 2369981 A | * | 6/2002 | ............. A01G 13/04 |
| --- | --- | --- | --- | --- |
| KR | 200432517 Y1 | * | 12/2006 | ............. A01G 9/021 |
| KR | 20140137638 A | * | 5/2013 | ............. A01G 9/042 |
| WO | WO-2008069167 A1 | * | 6/2008 | ............. A01C 1/044 |

* cited by examiner

PLANTER SYSTEM AND METHODS FOR GROWING AND DISPLAYING PLANTS

FIELD OF THE INVENTION

The present invention relates generally plant cultivation apparatus and methods.

BACKGROUND OF THE INVENTION

According to the 2015-2020 Dietary Guidelines for Americans, the recommended amount of vegetables in a 2,000-calorie diet is 2½ cup-equivalents of vegetables per day. Vegetables are an excellent source of nutrients required to maintain proper health. Microgreens, such as wheatgrass, micro herbs, pea shoots, barley grass, and the like are especially nutrient-dense, tender, delicious, and capable of being grown in limited space in a relatively short time. Because their nutritional value and variety, microgreens are popular and in high demand.

Most grocery and health food stores offer microgreens for sale. However, they are expensive and highly perishable if not cared for properly. Although skilled artisans have developed a variety of planter systems useful for growing microgreens at home to avoid the problems of purchasing them from grocery and health food stores, existing planter systems are not entirely satisfactory, expensive, difficult to use, and unnecessary complex, thereby necessitating continued improvement in the art.

SUMMARY OF THE INVENTION

According to the principle of the invention, a planter system includes a first vessel, a second vessel, a third vessel, and a plant growing medium. The first vessel and the second vessel are each fluid and light impervious and each includes a closed bottom and a rim encircling an opening over the closed bottom and configured with an inwardly-directed recess. The third vessel is fluid impervious, includes a perimetric extremity, and configured to hold the growing medium received therein through an opening defined by the perimetric extremity. The recess of the first vessel is configured to receive the perimetric extremity of the third vessel for supporting the third vessel over the first closed bottom. The recess of the second vessel is configured to receive the rim of the first vessel in a covering placement of the second vessel over the first vessel to form a shell by the first vessel and the second vessel, and the closed bottom of the first vessel in a supporting placement of the second vessel under the first vessel. The growing medium is a grow mat.

According to the principle of the invention, a method of growing and displaying plants includes providing a first vessel, a second vessel, a third vessel, and a plant growing medium. The first vessel is fluid and light impervious and includes a first closed bottom and a first rim encircling a first opening over the first closed bottom and configured with an inwardly-directed recess. The second vessel is fluid and light impervious and includes a second closed bottom and a second rim encircling a second opening over the second closed bottom and configured with an inwardly-directed recess. The third vessel is fluid impervious, includes a perimetric extremity, and configured to hold the growing medium received therein through an opening defined by the perimetric extremity. The first recess is configured to receive the perimetric extremity of the third vessel for supporting the third vessel over the first closed bottom. The second recess of the second vessel is configured to receive the first rim of the first vessel in a covering placement of the second vessel over the first vessel to form a shell by the first vessel and the second vessel, and the first closed bottom of the first vessel in a supporting placement of the second vessel under the first vessel. The method further includes supporting the first vessel the first closed bottom down, the first vessel extending upright from the first closed bottom to the first rim, supporting the third vessel over the first closed bottom by setting the perimetric extremity of the third vessel upon the first recess, the third vessel holding the growing medium received therein through the opening of the third vessel defined by the perimetric extremity, the growing medium having plant seeds dispersed thereover and the growing medium and the plant seeds moistened with water, placing the second vessel the second rim down over the first vessel and setting the second recess over the first rim supporting the second vessel over the first vessel in the covering placement of the second vessel over the first vessel, the first vessel and the second vessel forming the shell enclosing the third vessel, the plant seeds, and the growing medium, and light-isolating the plant seeds developing into plants growing from the growing medium over a duration, withdrawing the second vessel from the first vessel uncovering the plants growing from the growing medium, supporting the second vessel the second closed bottom down, the second vessel extending upright from the second closed bottom to the second rim, and setting the first closed bottom upon the second recess supporting the first vessel at an elevated location over the second closed bottom in the supporting placement of the second vessel under the first vessel, the first vessel extending upright from the first closed bottom to the first rim and the third vessel supporting the plants growing from the growing medium. The step of setting the rim of the third vessel upon the first recess supporting the third vessel at an elevated location over the first closed bottom further includes applying the third vessel into the first vessel through the first opening. The step of setting the first closed bottom upon the second recess supporting the first vessel at an elevated location over the second closed bottom further includes applying the first vessel the first closed bottom down into the second vessel through the second opening. The growing medium is preferably a grow mat.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Figure 1:
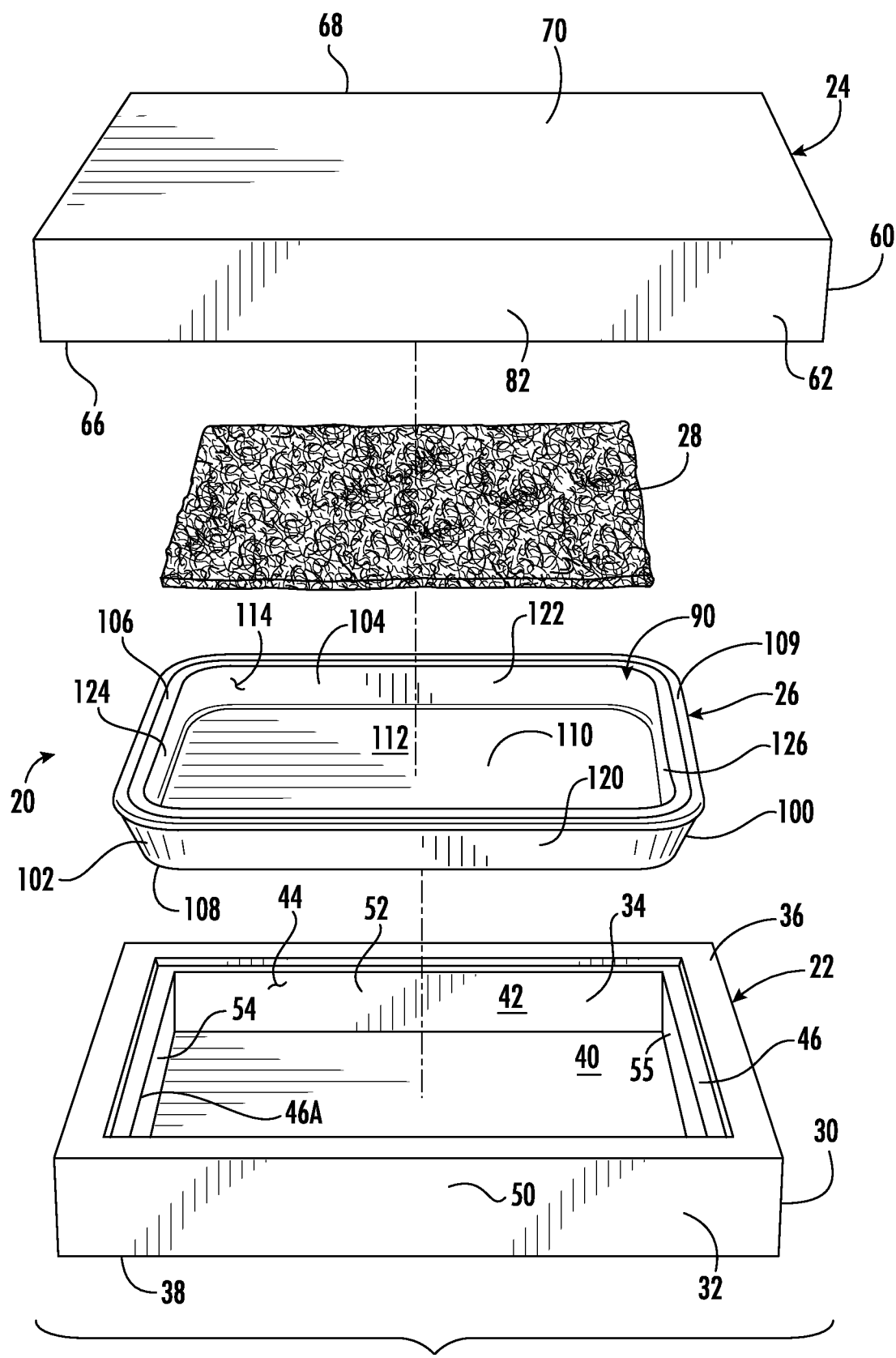
FIG. 1 is a perspective view of a planter system constructed and arranged in accordance with the principle of the invention, the planter system including a first vessel, a second vessel, a third vessel, and a plant growing medium shown as they would appear separated from one another for illustrative purposes and being configurable to enable cultivating plants from plant seeds and displaying the resulting cultivated plants.

Turning now to the drawings, like reference characters indicating corresponding elements throughout the several views, FIG. 1 illustrates planter system 20, including first vessel 22, second vessel 24, third vessel 26, and plant growing medium 28. Firsts vessel 22, second vessel 24, third vessel 26, and growing medium 28 are configurable to enable the easy, efficient, and inexpensive cultivating of plants from chosen plant seeds and displaying the resulting cultivated plants. Planter system 20 and the associated methods of using it to grow and display plants are useful for home or commercial use. Planter system 20 is portable, inexpensive, and easy to use without specialized tools or expertise.

Referring to FIGS. 1-4 in relevant part, first vessel 22 is a body useful as a container for receiving and holding contents placed therein and is fluid and light impervious. First vessel 22, fashioned of wood, metal, plastic, or other material or combination of materials having inherently strong, rigid, fluid impervious, and light impervious material characteristics, includes continuous sidewall 30 having outer surface 32, inner surface 34 upper edge or rim 36, and lower edge 38. First vessel 22 has a closed bottom defined by horizontal bottom 40 affixed to lower edge 38. Continuous sidewall 30 extends between lower edge 38 affixed to bottom 40 and rim 36 at the opposed open end of first vessel 22. Bottom 40 cooperates with inner surface 34 to form fluid impervious volume 42. Rim 36 is continuous and encircles opening 44 to volume 42 configured to receive contents placed therein and onto bottom 40 through opening 44 directly over bottom 40. Rim 36 is configured with inwardly-directed recess 46. Recess 46 faces inwardly and encircles opening 44, follows rim 36, and is continuous. Continuous sidewall 30 includes opposite side walls 50 and 52 that extend between opposite end walls 54 and 56. Side walls 50 and 52 at the respective sides of first vessel 22 are equal in length and longer than equal in length end walls 54 and 56 at the respective ends of first vessel 22. First vessel 22 is shallow and rectangular in this example, in which side walls 50 and 52 are perpendicular relative to end walls 54 and 56, the length of first vessel 22 from end wall 54 to end wall 56 is greater than the width of first vessel 22 from side wall 50 to side wall 52, and rim 36, lower edge 38, recess 46, and bottom 40 are each rectangular. Although first vessel 22 is rectangular in this embodiment, it can be round, oval, square, triangular, or other chosen shape.

Referring now in relevant part to FIGS. 1 and 5-7, second vessel 24 a body useful as a container for receiving and holding contents placed therein, like first vessel 22, is fluid and light impervious. Second vessel 24, fashioned of wood, metal, plastic, or other material or combination of materials having inherently strong, rigid, fluid impervious, and light impervious material characteristics, includes continuous sidewall 60 having outer surface 62, inner surface 64 upper edge or rim 66, and lower edge 68. Second vessel 24 has a closed bottom defined by horizontal bottom 70 affixed to lower edge 68. Continuous sidewall extends between lower edge 68 affixed to bottom 70 and rim 66 at the opposed open end of second vessel 24. Bottom 70 cooperates with inner surface 64 to form fluid impervious volume 72. Rim 66 is continuous and encircles opening 74 to volume 72 configured to receive contents placed therein onto bottom 70 through opening 74 directly over bottom 70. Rim 66 is configured with inwardly-directed recess 76. Recess 76 encircles opening 74, follows rim 66, and is continuous. Continuous sidewall 60 includes opposite side walls 80 and 82 that extend between opposite end walls 84 and 86. Side walls 80 and 82 and the respective sides of second vessel 26 are equal in length and longer than equal in length end walls 84 and 86 at the respective ends of second vessel 26. Second vessel 24 is shallow rectangular in this example. Side walls 80 and 82 are perpendicular relative to end walls 84 and 86, the length of second vessel 24 from end wall 84 to end wall 86 is greater than the width of second vessel 24 from side wall 80 to side wall 82, and rim 66, lower edge 68, recess 66, and bottom 70 are each rectangular. Although second vessel 24 is rectangular in this embodiment, it can be round, oval, square, triangular, or other chosen shape commensurate with first vessel 22.

Figure 8:
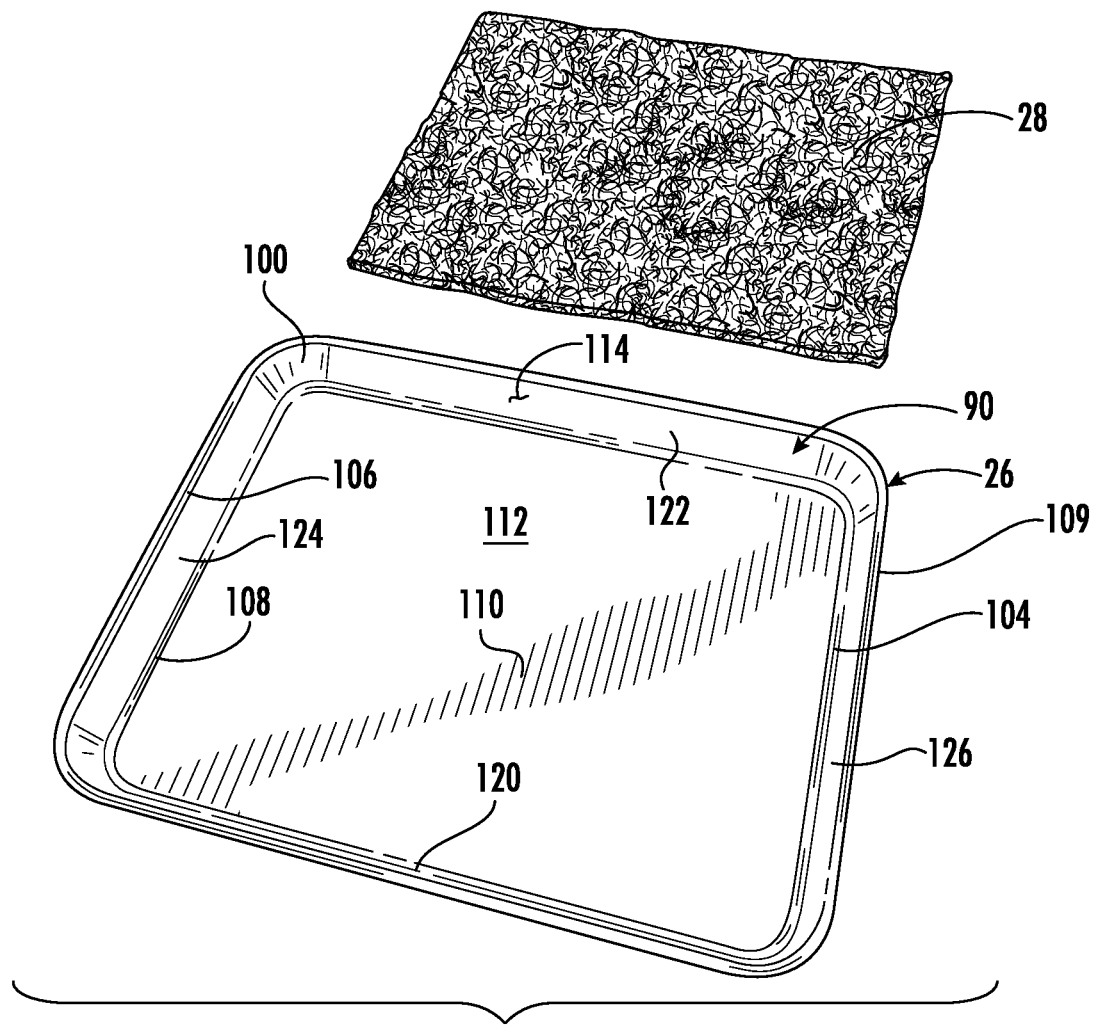
FIG. 8 is a perspective view of the third vessel and the growing medium first illustrated in FIG. 1 and shown as they would appear separated from one another.

Referring now to FIGS. 1 and 8 in relevant part, third vessel 26 is a body useful as a container for receiving and holding contents placed therein and is fluid and light impervious. Third vessel 24, fashioned of metal, plastic, or other material or combination of materials having inherently strong, rigid, and fluid impervious material characteristics not able to absorb fluids, includes a perimetric extremity 91. Perimetric extremity 90 includes continuous sidewall 100 having outer surface 102, inner surface 104, upper edge or rim 106, lower edge 108, and annular flange 109 extending radially outward from rim 106. Third vessel 22 has a closed bottom defined by horizontal bottom 110 affixed to lower edge 108. Continuous sidewall 100 extends between lower edge 108 affixed to bottom 110 and rim 106 at the opposed open end of third vessel 26. Bottom 110 cooperates with inner surface 104 to form fluid impervious volume 102. Rim 106 is continuous and encircles opening 104 to volume 102 configured to receive contents placed therein onto bottom 100 through opening 104 directly over bottom 100. Continuous sidewall 100 is low and slanted and includes opposite sidewalls 110 and 112 that extend between opposite end walls 114 and 116. Sidewalls 110 and 112 at the respective sides of third vessel 26 are equal in length and longer than equal in length end walls 114 and 116 at the respective ends of third vessel 26. Third vessel 26 is rectangular in this example, in which side walls 110 and 112 are perpendicular relative to end walls 114 and 116, the length of third vessel 26 from end wall 114 to end wall 116 is greater than the width of third vessel 26 from side wall 110 to side wall 112, and rim 106, lower edge 108, and bottom 100 are each rectangular. Although second vessel 24 is rectangular in this embodiment, it can be round, oval, square, triangular, or other chosen shape commensurate with first vessel 22 and second vessel 24.

Figure 2:
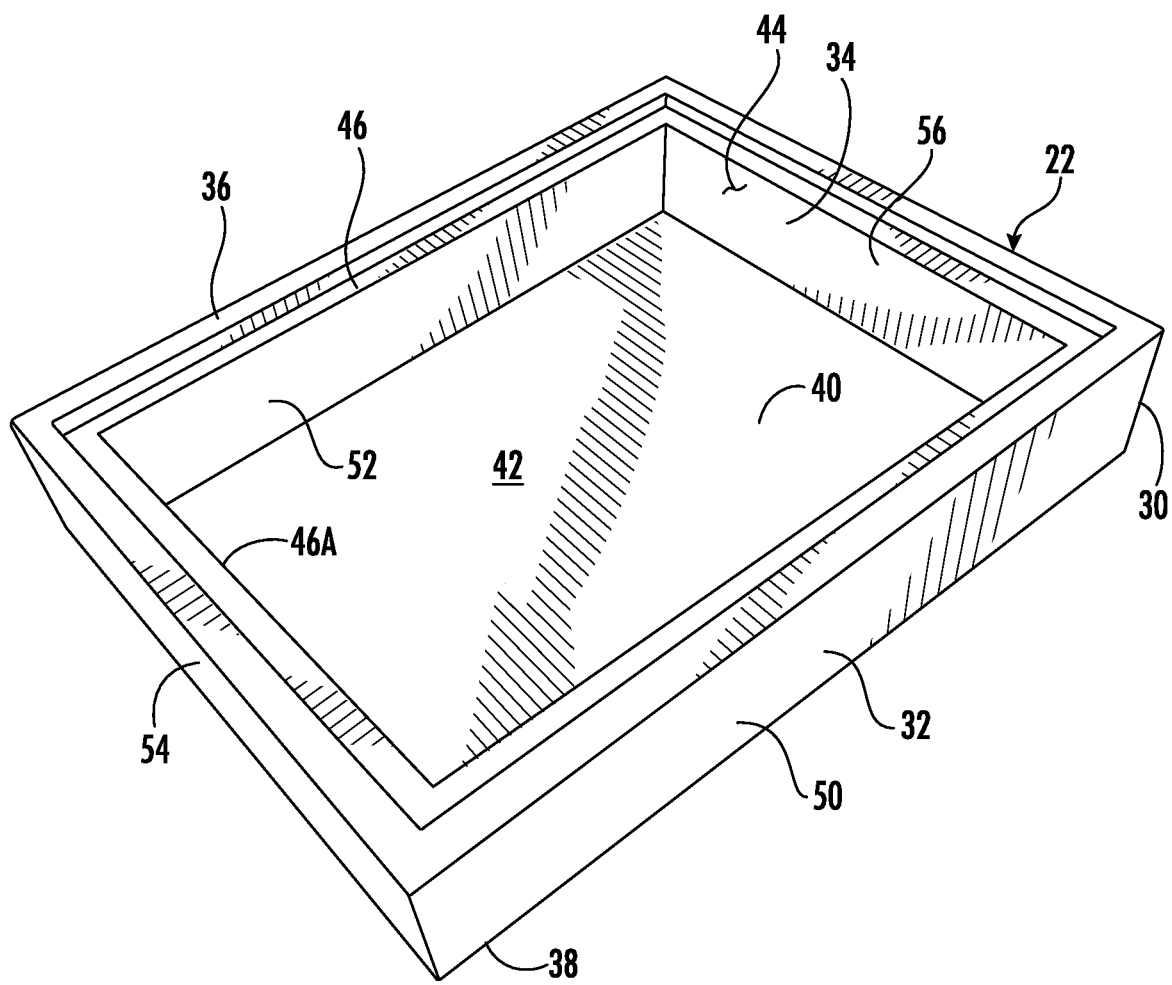
FIG. 2 is a perspective view of the first vessel of FIG. 1.
Figure 3:
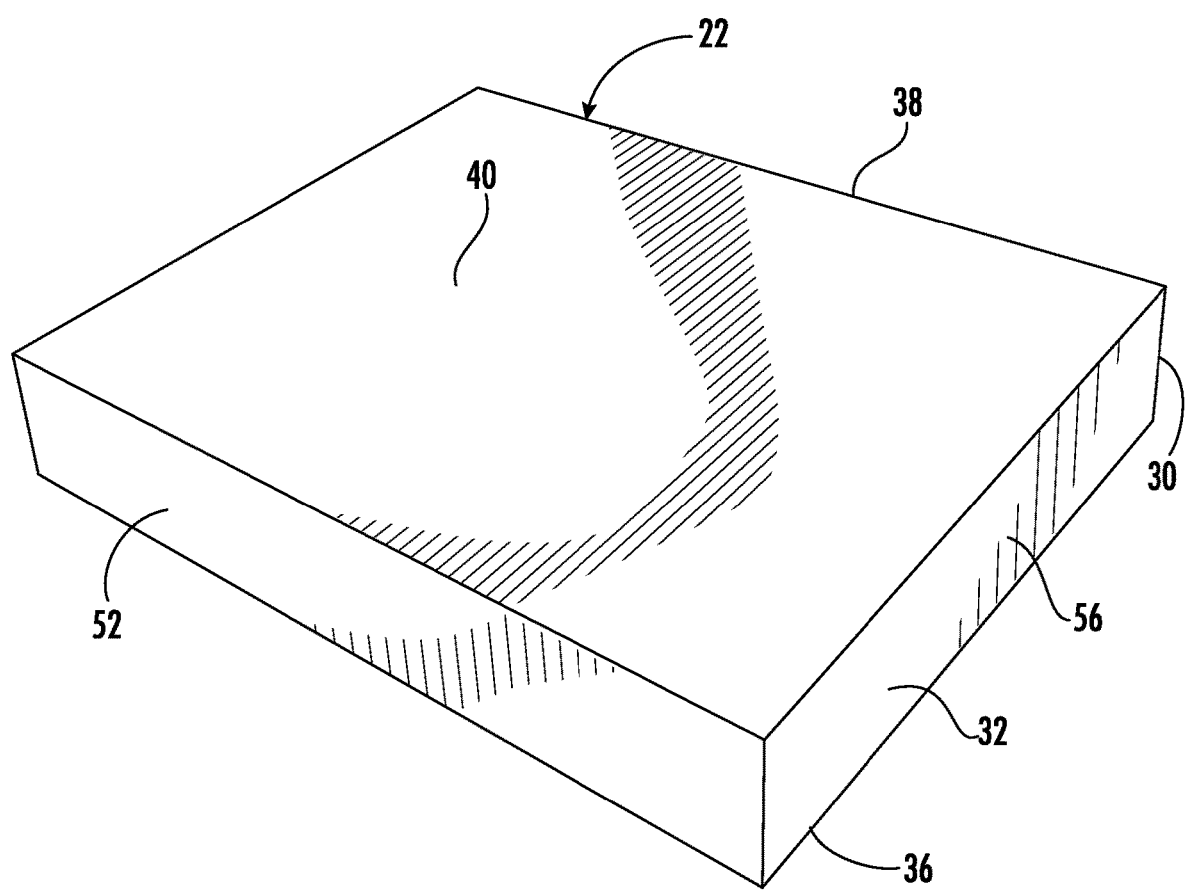
FIG. 3 is a bottom perspective view of the embodiment of FIG. 2.
Figure 4:
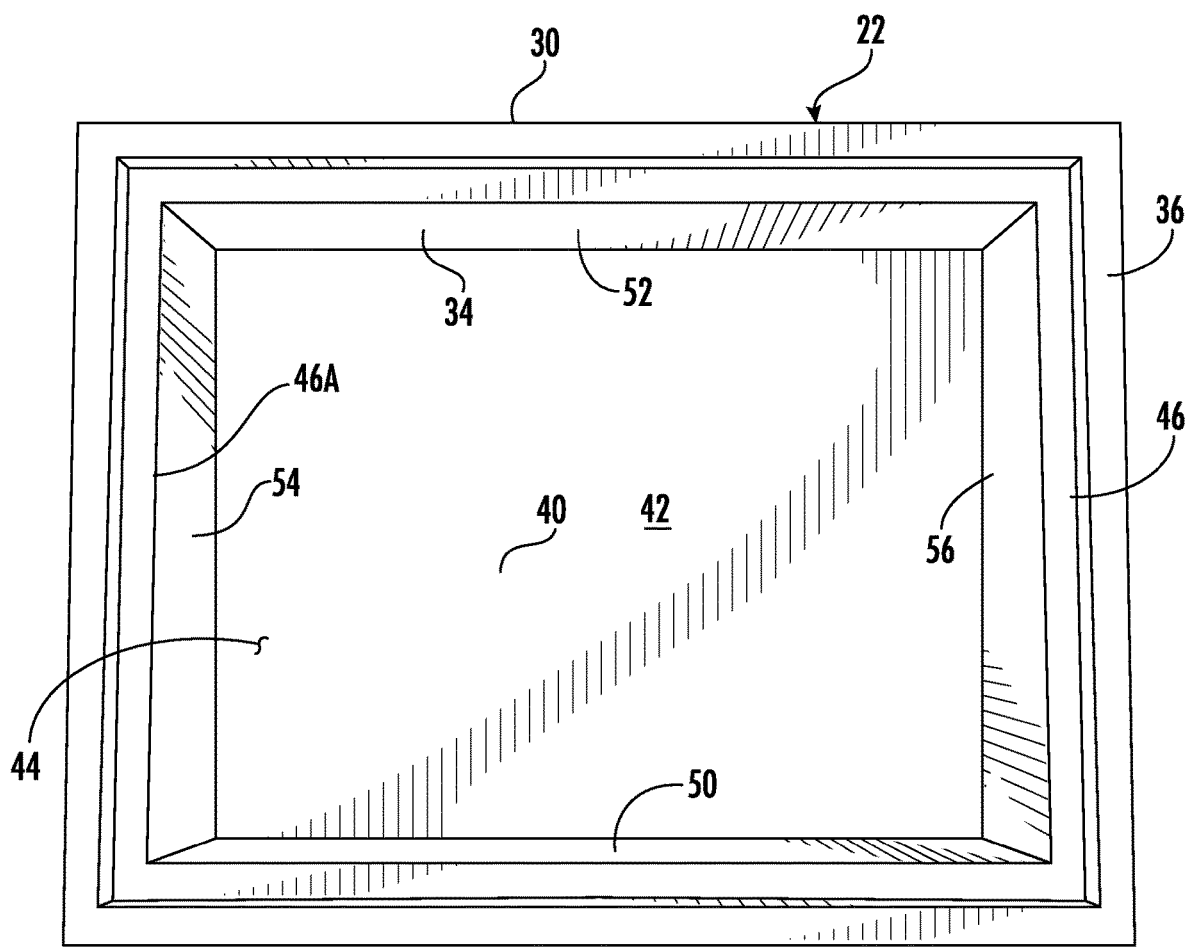
FIG. 4 is a top perspective view of the embodiment of FIG. 2.
Figure 5:
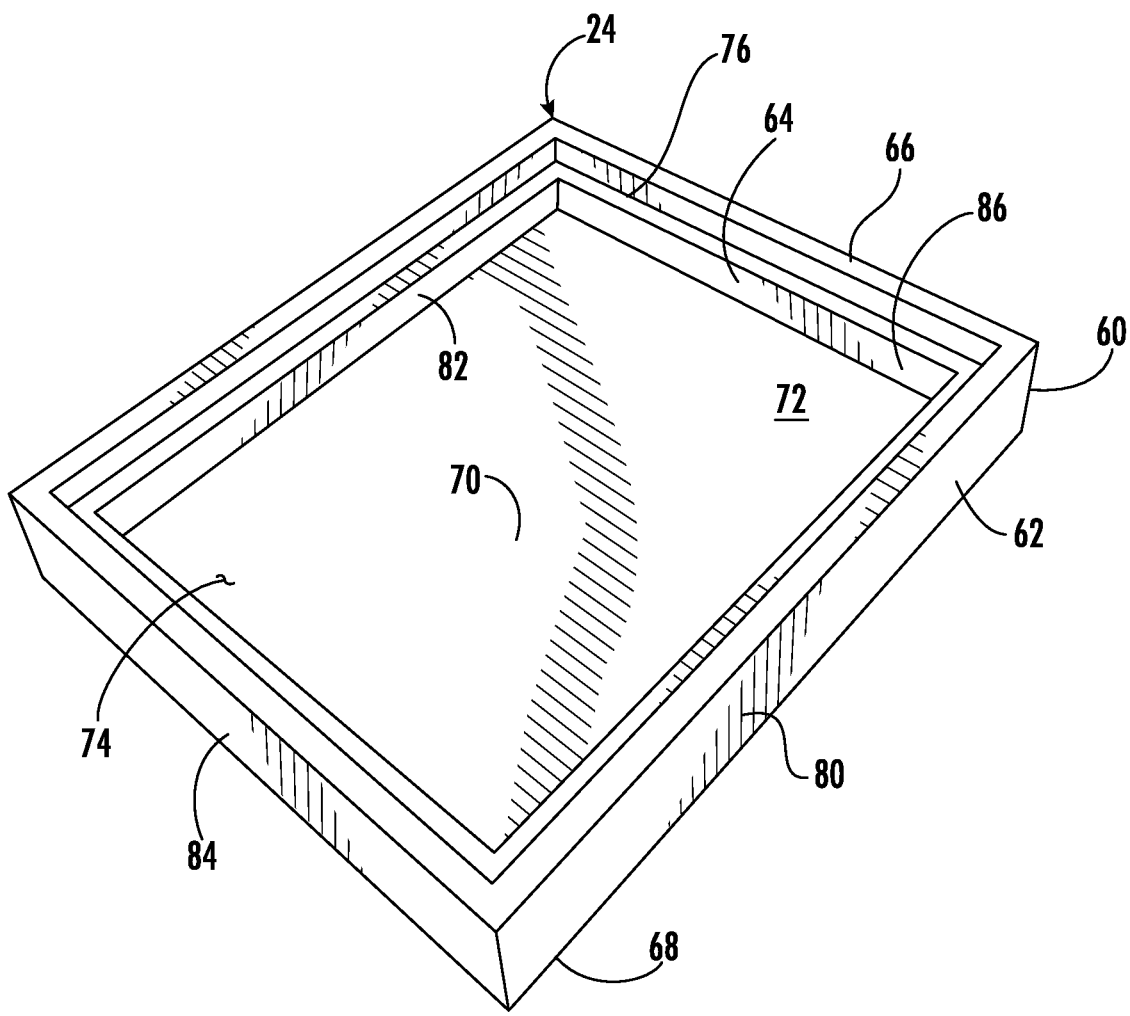
FIG. 5 is a perspective view of the second vessel of FIG. 1.
Figure 6:
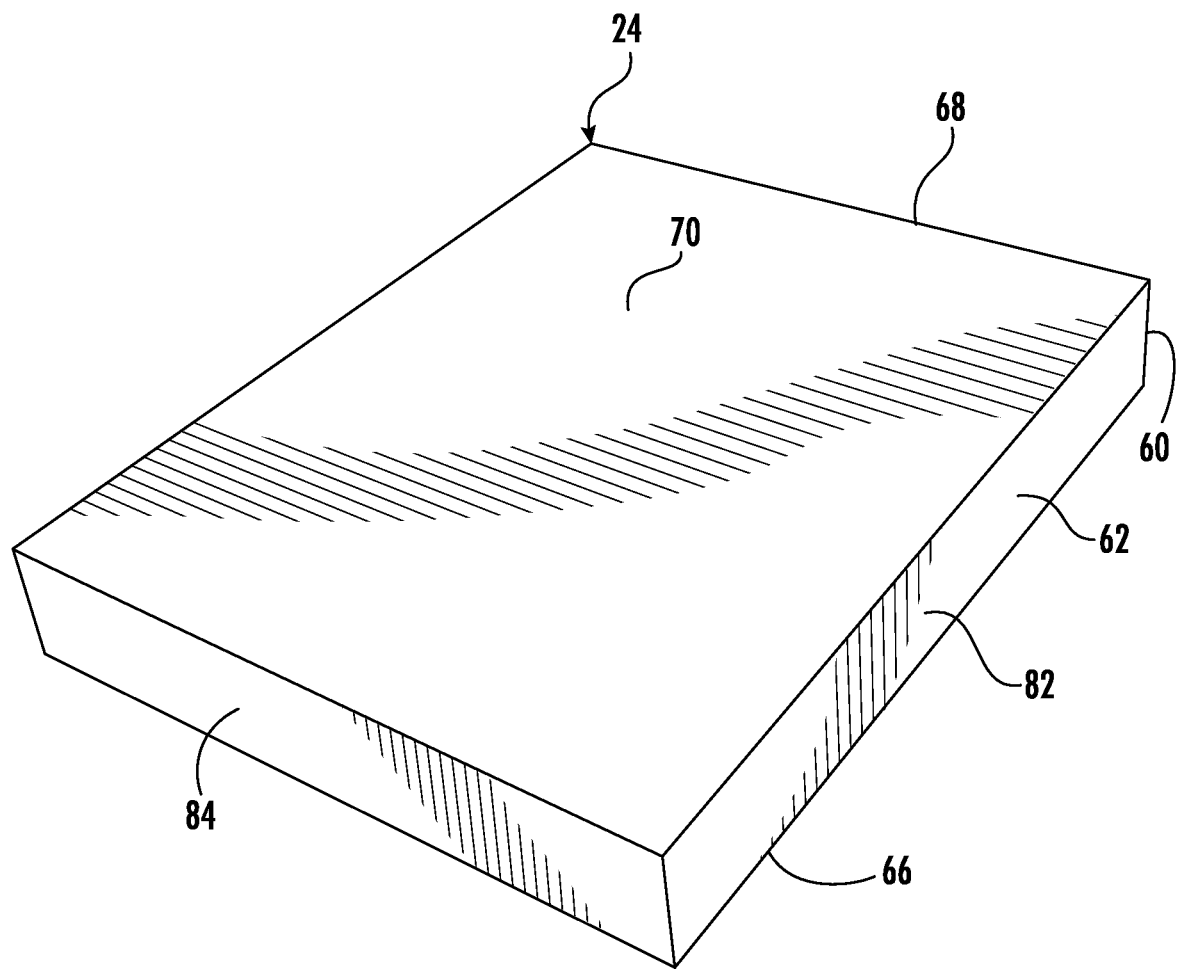
FIG. 6 is a bottom perspective view of the embodiment of FIG. 5.
Figure 7:
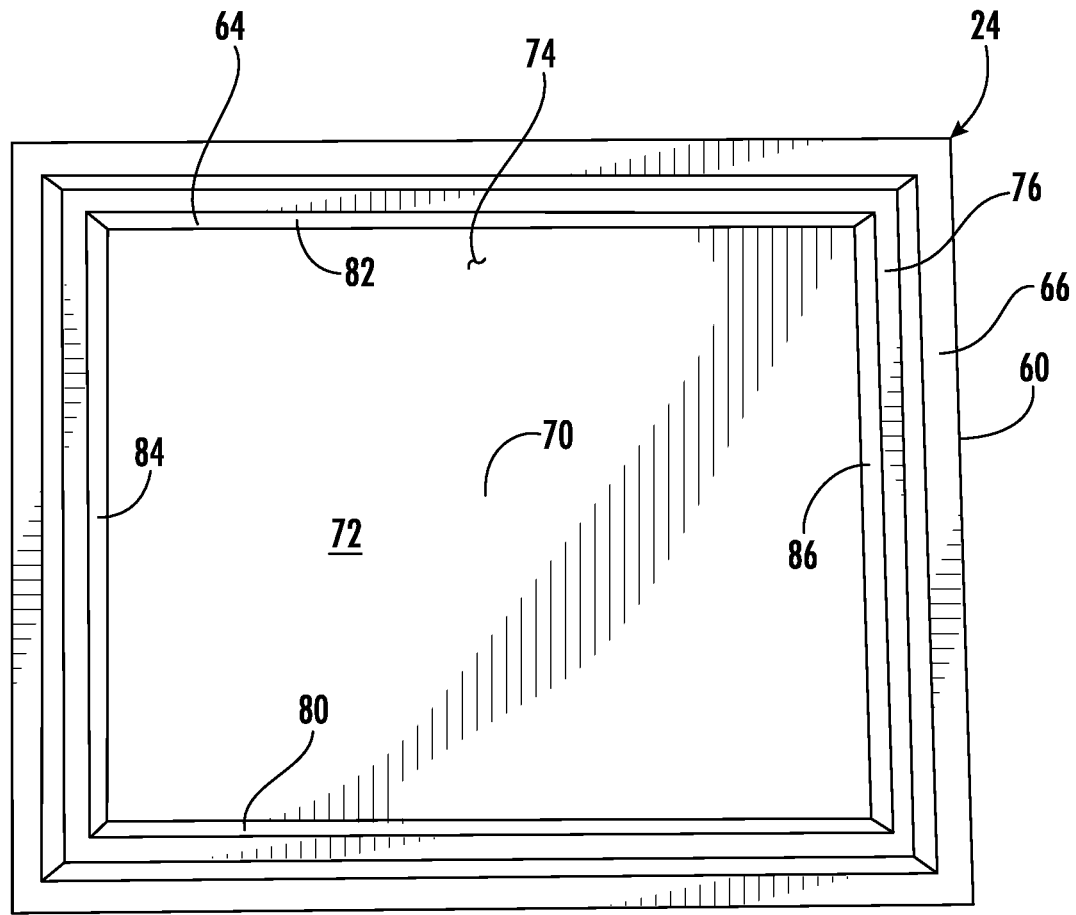
FIG. 7 is a top perspective view of the embodiment of FIG. 5.

Plant growing medium 28 in FIGS. 1 and 2 is suitable for growing seeds. Preferably, plant growing medium 28 is a suitable grow mat. Grow mat 28 is flat, rectangular, and suitably sized to cover bottom 110 of third receptacle 26. Grow mat 28, is of standard, unitary construction suitable for germinating plant seeds of microgreens, wheatgrass, micro herbs, pea shoots, barley grass, etc., that germinate best in darkness, and enabling the sprouted plants to take root in a grow therefrom. Grow mat 28 is made of felted, interwoven, or integrated hemp, wood fibers, jute fibers, coco coir, or other material or a combination of materials commonly used to make grow mats. Grow mat 28 is preferred because it is easy to use and manipulate by hand, inexpensive, and readily available. Loose soil or other chosen form of growing medium configured to enable germinating plant seeds to take root in and grow from are also useful in place of the described growing medium 28 in alternate embodiments.

Figure 14:
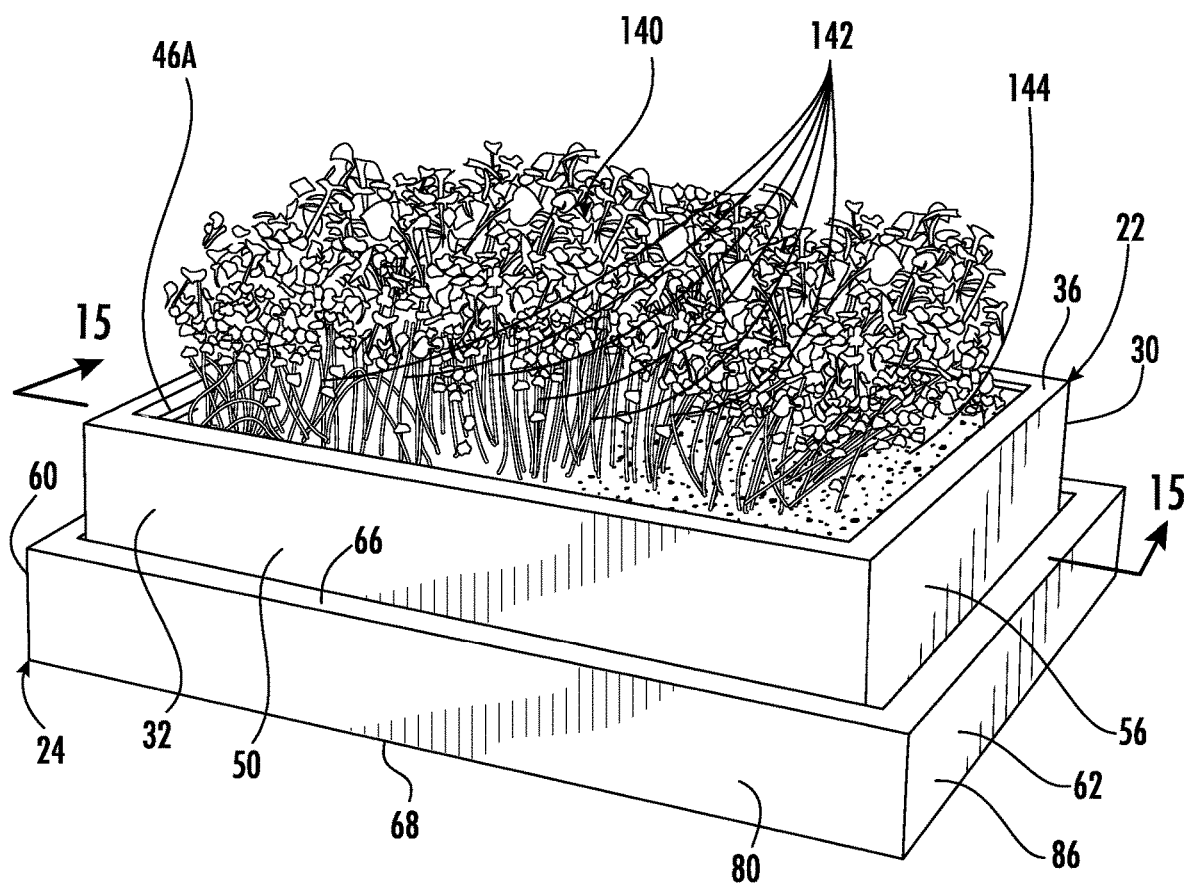
Figure 15:
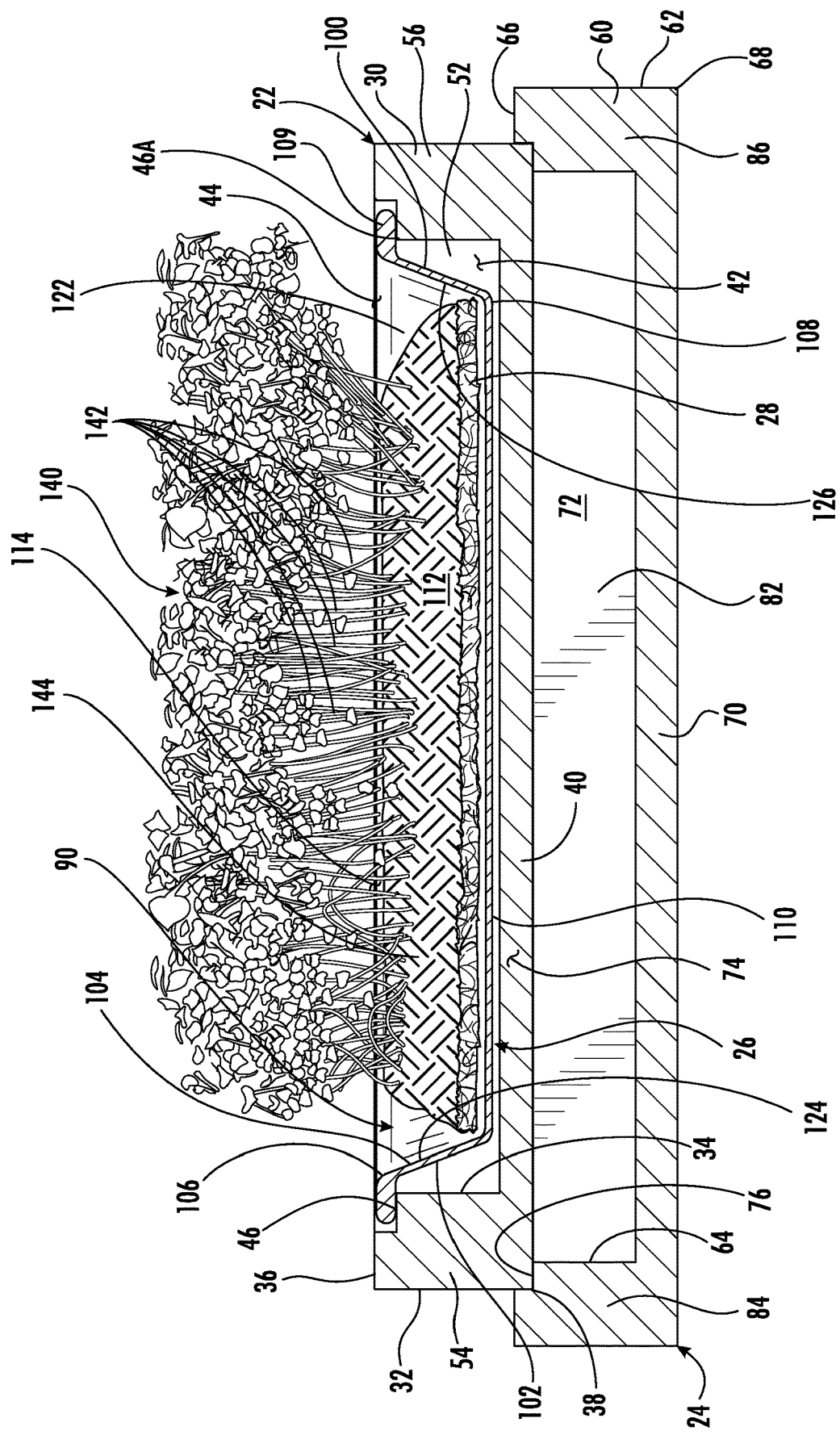

First vessel 22, second vessel 24, third vessel 26, and growing medium 28 and are appropriately sized and configured to be selectively assembled to work together in a sequence of suitable configurations for suitably cultivating plants from plant seeds and suitably displaying the cultivated plants according to the invention. Recess 46 of first vessel 22 is configured to receive annular flange 109 of perimetric extremity 90 of third vessel 26 in FIGS. 9 and 10 for supporting third vessel 26 bottom 110 down and rim 106 up in volume 42 over closed bottom 40 in FIGS. 9 and 10, third vessel 26 extending upright through volume 42 from bottom 110 elevated over bottom 40 of first vessel 22 to annular flange 109 of perimetric extremity 90 resting upon recess 46 of rim 36 of first vessel 22. Recess 76 of second vessel 24 is configured to be received over rim 36 of first vessel 22 in a covering or lidded placement of second vessel 24 rim 66 down bottom 70 up over first vessel 22 bottom 40 down rim 36 up in FIGS. 11, 12, and 13 to form a shell, denoted generally at 120, by first vessel 22 and second vessel 24 configured to enclose and light-isolate growing medium 28 when supported by third vessel 26 supported by first vessel 22. Recess 76 of second vessel 24 is additionally configured to receive bottom 40 of first vessel 22 bottom 40 down rim 36 up over second vessel 24 in a supporting placement of second vessel 24 extending upright under first vessel 22 from closed bottom 70 to rim 66 to support first vessel 22 extending upright from bottom 40 set upon recess 76 to rim 36 and to growing medium 28 when supported by third vessel 26 supported by first vessel 22 shown in FIGS. 14 and 15. In short, recess 46 is configured to receive annular flange 109 of perimetric extremity 90 of third vessel 26 for supporting third vessel 26 over bottom 40 of first vessel 22, and recess 76 of second vessel 24 is configured to receive rim 36 of first vessel 22 in the covering or lidded placement of second vessel 24 over first vessel 22 to form shell 120 by first vessel 22 and second vessel 24, and bottom 40 of first vessel 22 in a supporting placement of second vessel 24 under first vessel 22. Second vessel 24 is uniquely configured to work with first vessel 22 to serve as both a lid for placement over first vessel 22 to form shell 120 for light isolating plant seeds therein, and a support for placement under first vessel 22 for supporting first vessel 22 and its contents at an elevated location under second vessel 24. The fluid-impervious material characteristics of first, second, and third vessels 22, 24, and 26 disables water from leaking outwardly through the material of first, second, and third vessels 22, 24, and 26. Described below is an exemplary process for cultivating plants from plant seeds and displaying the cultivated plants with first vessel 22, second vessel 24, third vessel 26, and growing medium 28.

Figure 9:
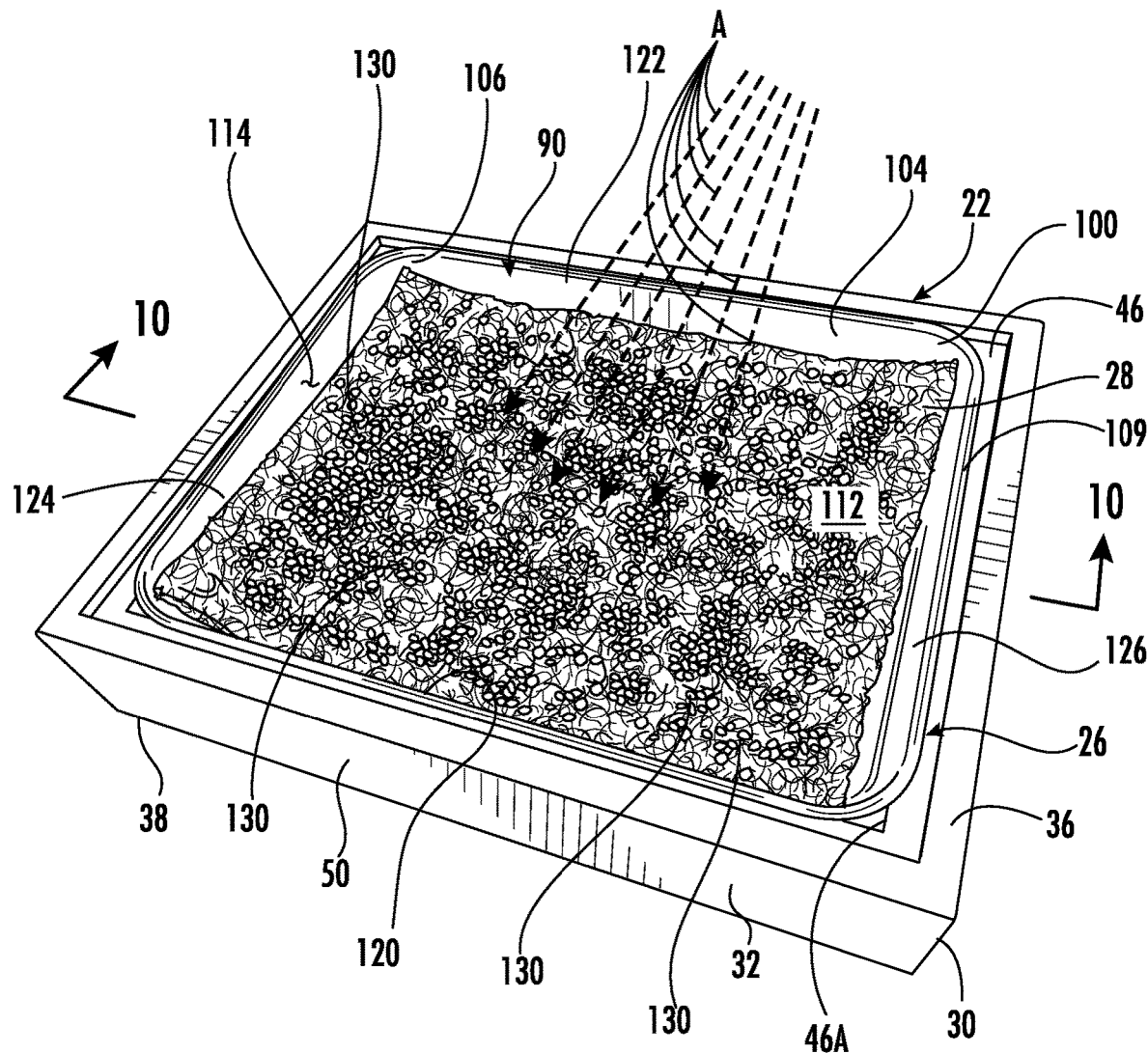
FIGS. 9-15 illustrate a sequence of steps of cultivating plants with the planter system of FIG. 1.
Figure 10:
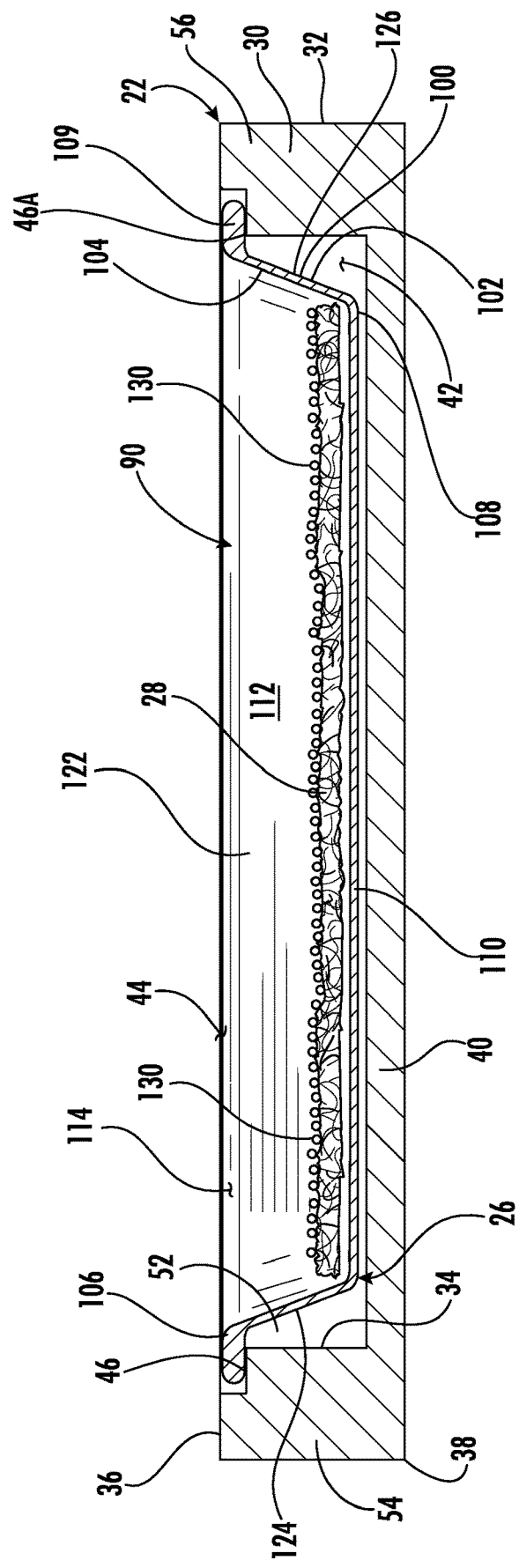

A user cultivates plants from plant seeds and displays the cultivated plants with planter system 20 first illustrated in FIG. 1 by supporting first vessel 22 bottom 40 down rim 36 up in FIGS. 2, 9, and 10, such as by placing first vessel 22 bottom 40 down on a countertop, tabletop, or other chosen support surface. Supported in this way, first vessel 22 extends upright from bottom 40 to rim 36. He then supports third vessel 26 bottom 110 down over bottom 40 by setting perimetric extremity 90 upon recess 46. To do this, he orients third vessel 26 bottom 110 down rim 106 up over opening 44 being careful to axial align bottom 110 over opening 44 to register perimeter extremity 90 with recess 46. Then he lowers third vessel 26 bottom 110 first into volume 42 of first vessel 22 through opening 44 and carefully sets annular flange 109 of perimetric extremity 91 directly upon recess 46. This suspends third vessel 26 in volume 42 over bottom 40 from recess 46. First vessel 22 extends upright through volume 42 from bottom 110 proximate to and elevated over bottom 40 to its rim 106 proximate to rim 26 of first vessel 22 and to annular flange 109 set upon recess 46. In the resulting assembly of first vessel 22 and third vessel 26, openings 44 and 114 occupy the same space, side walls 50 and 120 are juxtaposed, side walls 52 and 122 are juxtaposed, end walls 54 and 124 are juxtaposed, and end walls 56 and 126 are juxtaposed. The user then lowers growing medium into volume 112 through opening 114 and places it onto bottom 110 of third vessel 26, disperses plant seeds 130 into volume 112 of third vessel 26 through opening 114 and over growing medium 28 in an even layer, and moistens growing medium 28 and plant seeds 130 with water indicated by dashed arrows A. The user pours or sprays the water indicated by arrows A over growing medium 28 and plant seeds 130. The user may use water fortified with nutrients suitable for promoting plant seed germination if so desired.

In this example, recess 46 accepts annular rim 109 to suspend third vessel 26 in volume 42. Annular rim 109 is, of course, part of perimetric extremity 90. Therefore, the person of ordinary skill will appreciate that recess 46 accepts part of perimetric extremity 90 to suspend third vessel 26 in volume 42 of first vessel 22. In alternate embodiments, a user may configure first and second vessels 22 and 26 to enable outer surface 102 of continuous sidewall 100 of perimetric extremity 90 to rest along the innermost edge 46A of recess 46 denoted in FIGS. 1, 2, 4, 9, and 10-15. This would eliminate the need for annular flange 109.

After assembling first vessel 22 and third vessel 26 equipped with its moistened growing medium 28 and plant seeds 130, the user encloses and light-isolates third vessel 26 and its contents by and between first vessel 22 and second vessel 24 for a "blackout" duration or length of time. The blackout duration is sufficient to enable plant seeds 130 to germinate, grow shoots and take root in growing medium 28, into plants 140 in FIG. 13, including shoots 142 growing from roots 144 suitably rooted to growing medium 28 in the absence of light. This is especially useful for plant seeds 130 that germinate best in darkness, according to the invention. The blackout duration is two days, three days, four days, or other duration sufficient to allow plant seeds 130 to germinate suitably.

Figure 11:
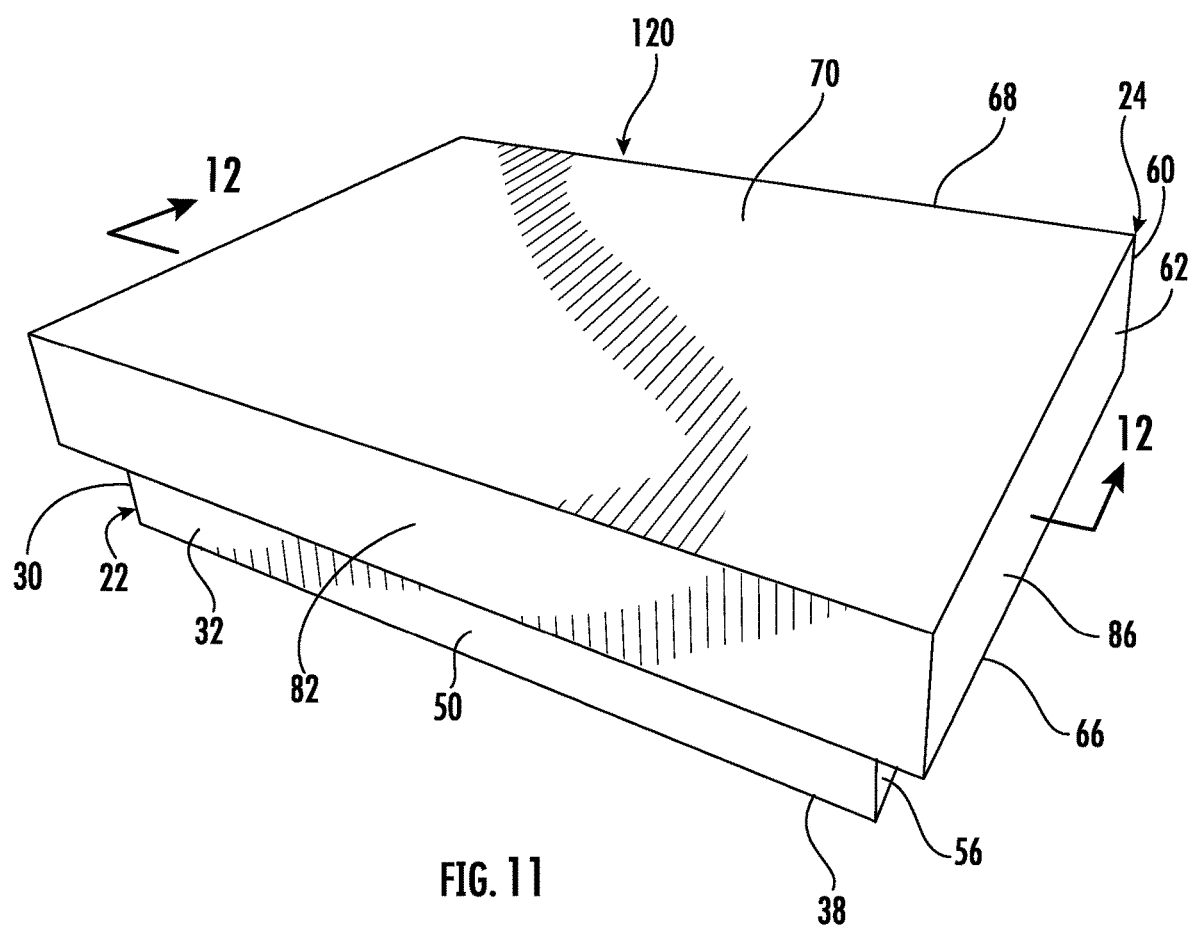
Figure 12:
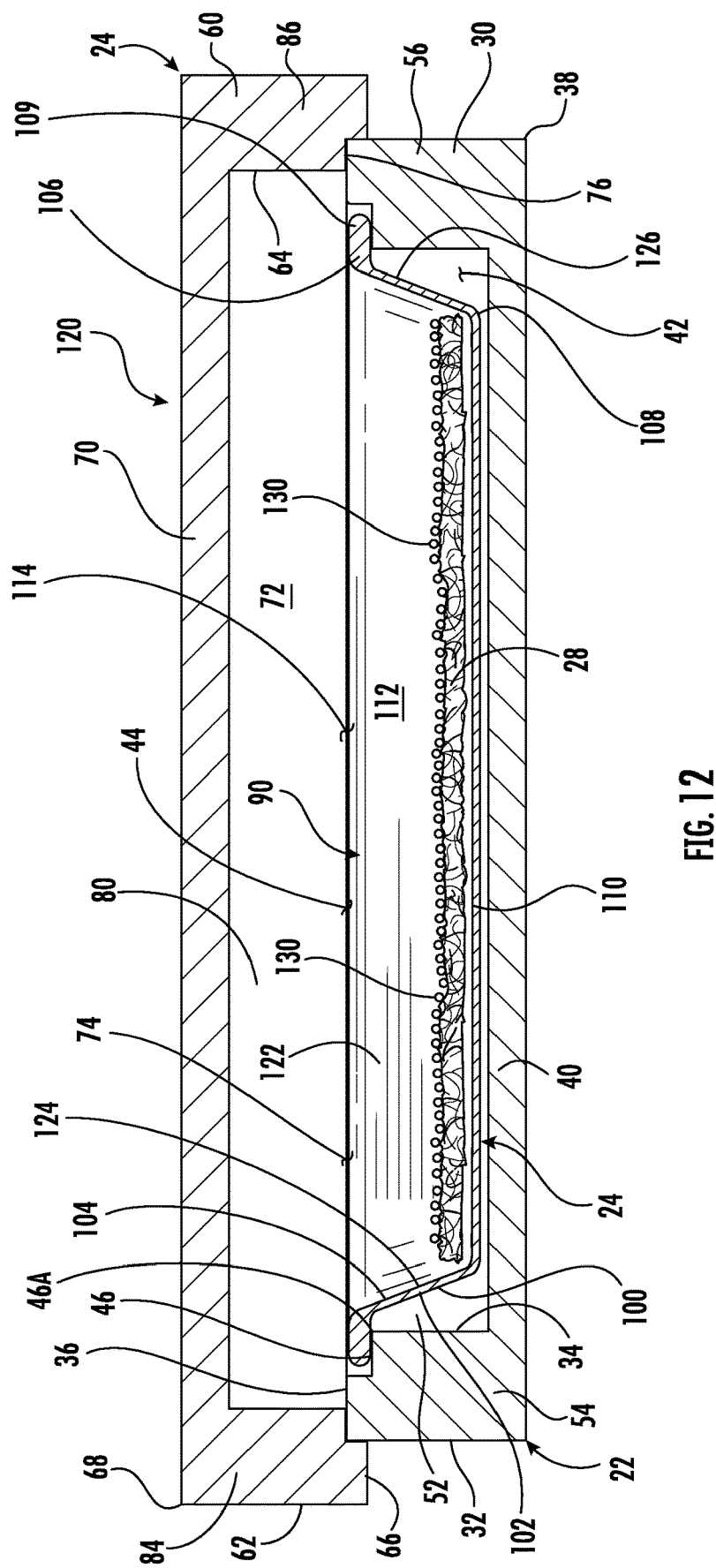
Figure 13:
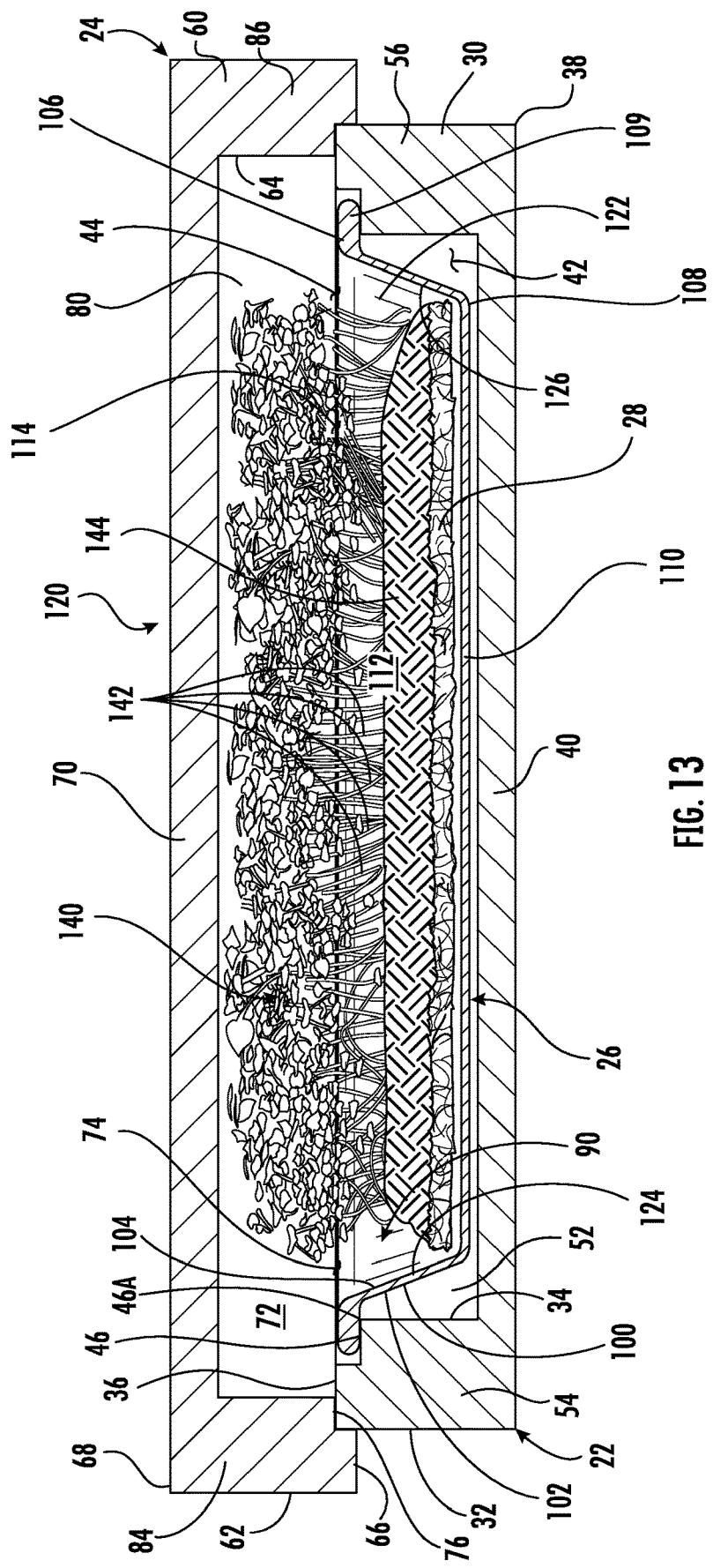

The user encloses and light-isolates third vessel 26 and its contents, moistened growing medium 28 and plant seeds 130, by placing second vessel 24 over first vessel 22 in the covering or lidded placement of second vessel 24 over first vessel 22 shown in FIGS. 11-13, in which second vessel 24 serves as a lid over first vessel 22. To do this, he orients second vessel 24 rim 66 down bottom 70 up over first vessel 22, being careful to axial align openings 44, 74, and 114, and register recess 76 with rim 36. Then he lowers second vessel 24 rim 66 down over first vessel 22 and carefully sets recess 76 directly over rim 36. This supports second vessel 24 over first vessel 22 in the covering or lidded placement of second vessel 24 over first vessel 22. First vessel 22 extends upright from bottom 40 to rim 36. Second vessel 24 extends upright from recess 76 over and in direct contact against rim 36 to bottom 70 and serves as a lid for first vessel 22 when fitted over first vessel 22 as herein specifically described forming the resulting shell 120 by and between first and second vessels 22 and 24. The constructed shell 120 formed by the assembly of first and second vessels 22 and 24 encloses volumes 42 and 72 of the respective first and second vessels 22 and 24 and light-isolates third vessel 26 and its described contents in volumes 72 and 112 enclosed by and between first vessel 22 under second vessel 24. In the resulting shell 120, openings 44, 74, and 114 occupy the same space, side walls 50 and 82 are juxtaposed, side walls 52 and 88 are juxtaposed, end walls 54 and 84 are juxtaposed, and end walls 56 and 86 are juxtaposed. Third vessel 26 extends upright through volume 42 of first vessel 22 from bottom 110 proximate to and elevated over bottom 40 to its opening 124. Volume 72 extends upright over the underlying volume 42 from openings 44, 74, and 114. The enclosed volumes 42 and 72 over plant seeds 130 provide sufficient "head space" between growing medium 28 in third vessel and bottom 70 of second vessel 26 for plant seeds 130 to germinate and grow into plants 140, including shoots 142 growing from roots 144 suitably rooted to growing medium 28 in FIG. 13. The user may remoisten growing medium 28 and plant seeds 130 as needed during the blackout duration. To do this, he withdraws second vessel 24 from its lidded placement over first vessel 22, applies fresh water to growing medium 28 and plant seeds 130, and carefully replaces second vessel 24 in its lidded placement over first vessel 22.

After plant seeds 130 have germinated suitably into plants 140 in FIG. 13 at the close of the blackout duration, the user withdraws second vessel 24 from its lidded placement over first vessel 22, third vessel 26 held by first vessel 22, and plants 140 growing from growing medium 28 held in third vessel 26 simply by raising second 24 vessel upwardly and away from first vessel 22 and its contents. This uncovers and exposes plants 140. He then reassembles first and second vessels 22 and 24 in the supporting placement of second vessel 24 under first vessel 22 to suitably secure first vessel 22 equipped with third vessel 26 and its contents and suitably display plants 140 in FIGS. 14 and 15. To do this, the user supports second vessel 24 bottom 70 down rim 66 up in FIG. 15, such as by placing second vessel 24 bottom 70 down on a countertop, tabletop, or other chosen support surface. Supported in this way, second vessel 24 extends upright from bottom 70 to rim 66. He then orients first vessel 22 bottom 40 down rim 36 up over second vessel 24, being careful to axially align bottom 40 with opening 74, and register the perimeter of bottom 40 with recess 76. The user then lowers first vessel 22 bottom 40 first into volume 72 of second vessel 24 through opening 74 and carefully sets the perimeter of bottom 40 extending inboard from lower edge 38 directly upon recess 76. This supports first vessel 22 at an elevated location over bottom 70 of the underlying second vessel 24 that serves as support for first vessel 22 and its contents. Second vessel 24 extends upright from bottom 70 at opening 74 to rim 66. First vessel 22 supported by the underlying second vessel 24 extends upright from bottom 40 fitted in recess 76 to rim 36. Third vessel 26 extends upright through volume 42 of first vessel 22 from bottom 110 proximate to and elevated over bottom 40 to its rim 106 proximate to rim 26 of first vessel 22 and to annular flange 109 set upon recess 46, and shoots 142 of plants 140 extend upright through opening 114 of third vessel 26 from roots 144 rooted in growing from medium 28 placed on bottom 110 of third vessel 26.

In the resulting assembly of first and second vessels 22 and 24 in the supporting placement of second vessel 24 under first vessel 22, bottom 40 of first vessel 22 occupies opening 74 of second vessel 24, side walls 50 and 80 are juxtaposed, side walls 52 and 82 are juxtaposed, end walls 54 and 84 are juxtaposed, end walls 56 and 86 are juxtaposed, and second vessel 24 supports first vessel 22 equipped with third vessel 26 and its contents at an elevated location over second vessel 24. This displays the exposed plants 140 growing upwardly through opening 114 of third vessel from roots 142 rooted in growing medium 28 in third vessel 26, enables a user to enjoy and inspect plants 140 visually, selectively harvest plants as desired, such as for consumption when plants 140 are edible, and water plants 140 as needed, and allows sunlight to reach plants 140 for enabling them to grow and remain healthy. After plants 140 have been consumed or become diminished following their typical lifecycle, growing medium 28 and the plant material may be removed from third vessel 26, first, second, and third vessels 22, 24, and 26 may be separated and cleaned if needed, the spent growing medium 28 may be replaced with a new one, and the entire process repeated for cultivating plants from chosen plant seeds and displaying the cultivated plants.

Those having regard for the art will readily appreciate that disclosed are an exemplary planter system 20 and associated methods of using it to grow and display plants. While the disclosed apparatus and methods are especially useful to grow and display edible microgreens, they are equally useful with other edible and non-edible plants.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A method of growing and displaying plants, comprising:
providing a first vessel, a second vessel, a third vessel, and a plant growing medium;
the first vessel is fluid and light impervious and includes a first closed bottom and a first rim encircling a first opening over the first closed bottom and configured with an inwardly-directed recess;
the second vessel is fluid and light impervious and includes a second closed bottom and a second rim encircling a second opening over the second closed bottom and configured with an inwardly-directed recess;
the third vessel is fluid impervious, includes a perimetric extremity, and configured to hold the growing medium received therein through an opening defined by the perimetric extremity;
the first recess is configured to receive the perimetric extremity of the third vessel for supporting the third vessel over the first closed bottom, and the second recess of the second vessel is configured to receive the first rim of the first vessel in a covering placement of the second vessel over the first vessel to form a shell by the first vessel and the second vessel, and the first closed bottom of the first vessel in a supporting placement of the second vessel under the first vessel;
supporting the first vessel with said first closed bottom down, the first vessel extending upright from the first closed bottom to the first rim;
supporting the third vessel over the first closed bottom by setting the perimetric extremity upon the first recess, the third vessel holding the growing medium received therein through the opening of the third vessel defined by the perimetric extremity, the growing medium having plant seeds dispersed thereover and the growing medium and the plant seeds moistened with water;

placing the second vessel with said second rim down over the first vessel and setting the second recess over the first rim supporting the second vessel over the first vessel in the covering placement of the second vessel over the first vessel forming the shell, the first vessel and the second vessel enclosing the third vessel, the plant seeds, and the growing medium, and light-isolating the plant seeds developing into plants growing from the growing medium over a duration;

withdrawing the second vessel from the first vessel uncovering the plants growing from the growing medium;

supporting the second vessel with said second closed bottom down, the second vessel extending upright from the second closed bottom to the second rim; and setting said first closed bottom upon the second recess supporting the first vessel at an elevated location over the second closed bottom in the supporting placement of the second vessel under the first vessel, the first vessel extending upright from the first closed bottom to the first rim and the third vessel supporting the plants growing from the growing medium.

2. The method according to claim 1, wherein the step of setting the perimetric extremity upon the first recess further comprises applying the third vessel into the first vessel through the first opening.

3. The method according to claim 1, wherein the step of setting said first closed bottom upon the second recess supporting the first vessel at an elevated location over the second closed bottom further comprises applying the first vessel with said first closed bottom down into the second vessel through the second opening.

4. The method according to claim 1, wherein the growing medium comprises a grow mat.

* * * * *